(12) United States Patent
Widman

(10) Patent No.: US 6,835,268 B2
(45) Date of Patent: Dec. 28, 2004

(54) METHOD FOR TRANSFERRING AN IMAGE ONTO AN OBJECT HAVING CURVED SURFACES

(75) Inventor: Marshall Widman, Leawood, KS (US)

(73) Assignee: Star Innovations, L.C., New Century, KS (US)

( * ) Notice: Subject to any disclaimer, the term of this patent is extended or adjusted under 35 U.S.C. 154(b) by 0 days.

(21) Appl. No.: 10/328,502

(22) Filed: Dec. 24, 2002

(65) Prior Publication Data

US 2004/0118508 A1 Jun. 24, 2004

(51) Int. Cl.$^7$ ................................................ B44C 1/165
(52) U.S. Cl. ...................... 156/235; 156/230; 156/240; 156/241
(58) Field of Search ................................ 156/230, 234, 156/235, 237, 240, 241, 247, 277, 217; 427/146–148; 428/41.6, 41.7, 41.8, 42.1, 145, 202, 203, 814, 201; 101/33–35; 473/52, 125, 351, 371, 413, 588, 600, 601, 607, 604, 590

(56) References Cited

U.S. PATENT DOCUMENTS 3,580,772 A * 5/1971 Vergara Ochoa ............ 156/240
4,610,950 A    9/1986 Milliken ...................... 430/506
5,832,819 A * 11/1998 Widman ....................... 101/34
5,878,670 A * 3/1999 Yamaguchi ................. 101/492
6,217,464 B1 * 4/2001 Chang .......................... 473/378

* cited by examiner

Primary Examiner—Sue A. Purvis
Assistant Examiner—Yewebdar Tadesse
(74) Attorney, Agent, or Firm—Shook, Hardy & Bacon LLP

(57) ABSTRACT

The present invention discloses an improved method for transferring an image onto an object which has a surface that curves in two directions. After providing a source containing an image capable of thermal transfer, a target surface is chosen on the object and a chemical coating is applied. The image is then pressed into the coated target surface until the target surface is substantially flat and heated so that the image is transferred to the target surface. The coating allows the image to be transferred at a low temperature. In a preferred embodiment, after the source is removed, a second application of heat is applied to the object to drive the image into the object. A protective material may be positioned between the heating element and the image, especially before the second application of heat.

16 Claims, 2 Drawing Sheets

FIG.5.
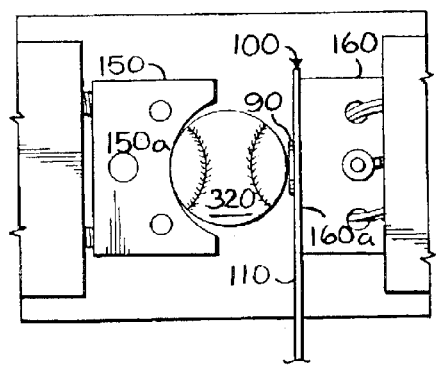
FIG.6.
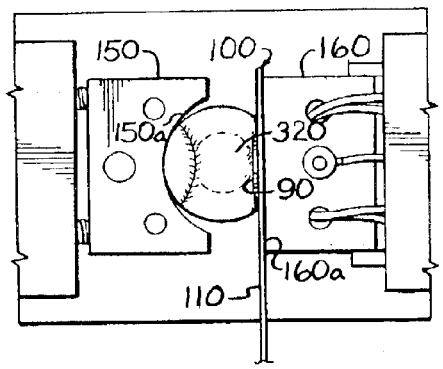
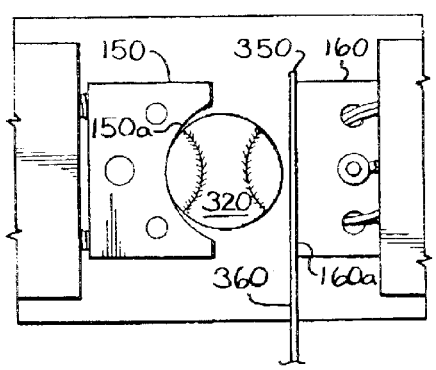
FIG.7.

METHOD FOR TRANSFERRING AN IMAGE ONTO AN OBJECT HAVING CURVED SURFACES

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates in general to an improved method for transferring an image onto an object having curved surfaces. More particularly, this invention relates to an improved method for effecting thermal transfer of an image onto a surface which is generally convex in two directions.

In U.S. Pat. No. 5,832,819, which is incorporated herein by reference, a method for transferring an image onto an object having curved surfaces is described. Generally, the method comprises the steps of providing a photograph, photocopy or other graphical representation (hereinafter referred to as a source) having thereon an image capable of thermal transfer, placing the source against an object having curved surfaces so that the image is aligned with a target surface, pressing the source until the target surface is substantially flat, and then heating the source to a temperature between 350 and 750 degrees Fahrenheit (depending on the target surface) so that the image is transferred to the target surface. If the object is a vinyl covered baseball, the preferred temperature is between 475 and 525 degrees Fahrenheit.

The method described in U.S. Pat. No. 5,832,819 effectively transfers an image to an object. There was a concern with the method, however, relating to the fact that the temperature at which the transfer occurs often is significantly higher than the melting point of the object. Specifically, the high transfer temperature makes the timing of the process critical because deviation in that timing may lead to the object melting.

In an effort to reduce the likelihood of damage to the object, several additional steps were investigated. After some time, it was decided that the best additional step was to submerse the heated object in cold water or alcohol immediately after the image is transferred. Unfortunately, while this submersion step worked well, it also caused a significant delay in the process so that the object could be dried. With the addition of a submersion step, and the subsequent drying, the process for transferring an image onto a baseball took as long as seven to ten minutes.

It was therefore undertaken to provide an improved method of transferring an image onto an object that has a surface that curves in two directions which does not employ temperatures that may damage the object and which was both efficient and cost-effective. One area that was investigated was to determine if a substance applied to the object would allow the image to adhere at a lower temperature. In order to be effective, the substance would have to be clear so that the appearance of the object would not change, be able to bond with the object without separating, be flexible so that it would not crack or disfigure when the object was flattened, and be heat resistant so that it would not melt when heat was applied.

After considerable research, a chemical coating was discovered that satisfied these needs. Specifically, it was discovered that if the chemical coating was properly applied to the target surface, the image would transfer quickly at a significantly lower temperature. For example, with the chemical coating properly applied, an image could be transferred onto a baseball if the source was subjected to a temperature between 190 and 200 degrees Fahrenheit for as little as 15 seconds. This temperature and time was sufficient to protect the baseball from melting, and, therefore, the submersion step with the resultant drying was no longer required.

Research continued in an attempt to further improve the method, and specifically, to determine if steps could be undertaken to decrease the vulnerability of an image to scratching and other damage after the image had been transferred. This research revealed that heating the image a second time after the image had been transferred to the object would "set" the image. In addition, the second application of heat had the effect of giving the image a crisper, more professional appearance. The research also revealed that using a heat gun to accomplish this second heating was too slow and uncertain. Instead, the image needed to receive heat directly.

Thereafter, it was determined that directly pressing the image a second time with a heating element effectively drove the image into the object although the heating element required cleaning afterwards. Also, using the heating element directly against the object raised the risk that the object would be damaged. After further research, it was found that placing a protective material between the heating element and the image for at least the second heating would cause the image to be driven into the surface of the object while preventing the image from transferring back to the heating element. Careful selection of the protective material also insured that the image would not attach to the material.

With the added steps of applying a chemical coating to the target surface before transferring the image and inserting a protective material between the object and the heating element before applying heat to the image a second time reduced the time it took to produce a finished product from seven to ten minutes to one minute or less. In addition, the final product would have a more professional appearance.

BRIEF SUMMARY OF THE INVENTION

The present invention discloses an improved method for transferring an image onto an object which has a surface that curves in two directions. After providing a source containing an image capable of thermal transfer, a target surface is chosen on the object and a chemical coating is applied. The image is then pressed into the coated target surface until the target surface is substantially flat and heated so that the image is transferred to the target surface. The coating allows the image to be transferred at a low temperature. In a preferred embodiment, after the source is removed, a second application of heat is applied to the object to drive the image into the object. A protective material may be positioned between the heating element and the image, especially before the second application of heat.

BRIEF DESCRIPTION OF THE SEVERAL VIEWS OF THE DRAWING

In the accompanying drawings which form a part of the specification an are to be read in conjunction therewith:

FIG. 5 is a partial top plan view of the apparatus shown in FIG. 4 wherein the source, which is attached to a backing sheet, is contacting the target surface with which it is aligned in accordance with a preferred embodiment of the present invention;

FIG. 6 is a partial top plan view of an apparatus shown in FIG. 4 wherein the backing sheet with the attached source is pressed against the target surface in accordance with a preferred embodiment of the present invention so as to deform the baseball and provide a substantially flattened target surface; and FIG. 7 is a partial top plan view of an apparatus shown in FIG. 4 wherein a sheet with protective material is contacting the target surface with which it is aligned in accordance with the one embodiment of the present invention.

DETAILED DESCRIPTION OF THE INVENTION

The present invention is an improved method of transferring an image onto an object having a surface that is generally convex in two directions. The improved method allows the transfer to occur at temperatures lower than the temperatures utilized in prior methods and, especially, at temperatures lower than the melting point of the object. The improved method is also less time consuming than prior methods and, therefore, is more efficient and cost-effective.

Figure 1:
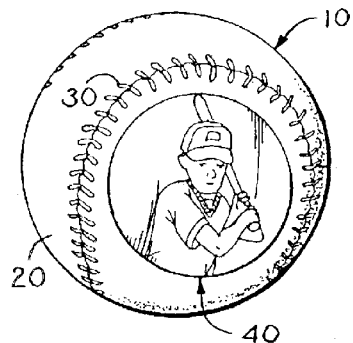
FIG. 1 is a perspective view of a souvenir baseball produced in accordance with a preferred embodiment of the present invention.
Figure 2:
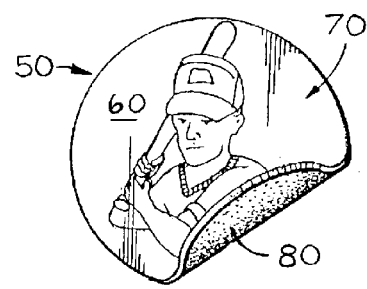
FIG. 2 is a front elevational view of a source having an image for use in accordance with a preferred embodiment of the present invention, a portion of the source being folded over to reveal the back side of the source.

Referring to the drawings in greater detail, and initially to FIG. 1, a souvenir baseball made pursuant to the present invention is designated by the numeral 10. Baseball 10 comprises a cover 20, stitching 30, and an image 40 that has been transferred onto cover 20. Image 40 was derived from source 50 shown in FIG. 2. Source 50 has a front side 60 containing image 70 and a back side 80. As can be seen, image 40 is the mirror of image 70.

It should be understood that source 50 may be a photograph, a photocopy or any other graphical representation capable of thermal transfer onto a curved object. Also, image 70 may be a picture, a portrait, text, or some combination of graphics and text. One example of a source capable of having an image thereon that may be transferred with the application of heat is the transfer paper that those skilled in the art would use for transferring a picture onto a T-shirt. It should also be understood that an image may comprise many different types of inks, dyes, toners and/or other coloring agents.

Figure 3:
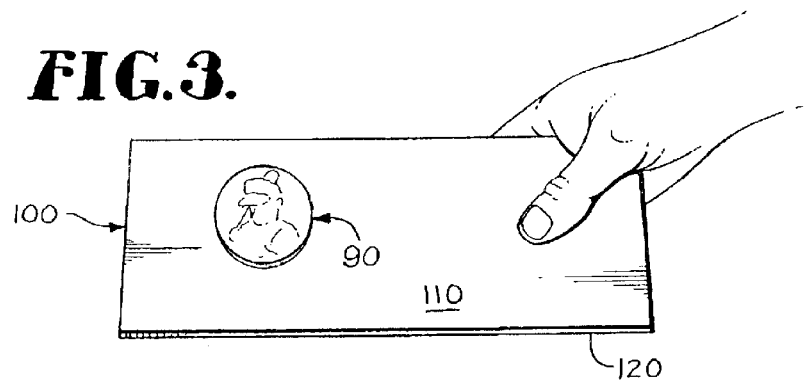
FIG. 3 is a perspective view of a source attached to the front side of a backing sheet in accordance with a preferred embodiment of the present invention.

In one embodiment of the present invention, source 50 is a color photograph that is transferred onto baseball 10 through sublimation. As shown in FIG. 3, photograph 90 is coupled to a generally planar backing sheet 100 having a front side 110 and a back side 120. More particularly, the back or reverse side of photograph 90 is attached to front side 110 of backing sheet 100. Preferably, this is accomplished by applying an adhesive to the back side of photograph 90.

Figure 4:
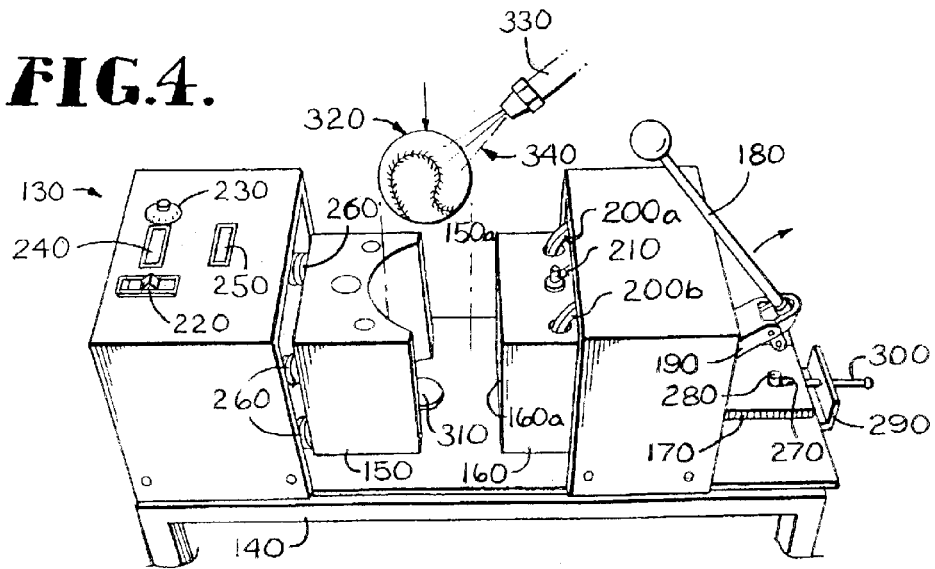
FIG. 4 is a perspective view of an apparatus for performing the present invention wherein an arrow indicates the range of movement of a lever arm and a second arrow and corresponding set of broken lines indicate the placement of a baseball within the apparatus.

Referring now to FIG. 4, an apparatus 130 is shown for carrying out the sublimation process of the present invention. Apparatus 130 includes a support platform 140, a spring-mounted die 150 and a moveable die plate 160. Base 140 presents a generally planar horizontal surface to which is mounted a track 170 which accommodates lateral horizontal movement of die plate 160. Lever actuator 180 is coupled with die plate 160 through linkage 190. Electrical leads 200a and 200b are coupled to an electrical energy source to provide resistance heating to die plate 160 (the heater is not shown). Conductor 210 is an electrical ground wire. On/off switch 220 controls the flow of electricity to the die plate heater, and knob 230 is a thermostat control. Lights 240 and 250 provide a visual indication of when the resistance heater is on and when it has achieved a desired preset temperature. Die 150 is mounted for limited reciprocal horizontal movement against the resistance of four identical mounting springs 260, three of which are visible in FIG. 4.

Track 170 is provided with an elongated slot 270 which receives a stationary retaining pin 280. Bracket 290 is rigidly mounted on base 140 and receives screw 300 in a threaded opening. Screw 300 may be adjusted toward or away from track 170 so as to present a stop. Adjustment of screw 300 determines the length of movement of die plate 160 in response to movement of lever actuator 180.

It is to be noted that the face. 160a of die plate 160 presents a smooth surface that is either flat or very slightly curved. If face 160a is very slightly curved, a larger image may be transferred. Face 150a of die 150 is concave and has a radius of curvature generally corresponding to the radius of curvature of the object receiving the image. A baseball 320 is the intended object shown in FIG. 4, and, thus, face 150a has a concave radius approximately equal to a baseball. A cup 310 centrally positioned relative to die face 150a provides a seat for placement of the object.

Also shown in FIG. 4 is a nozzle 330 that is part of a sprayer apparatus (not shown). The sprayer apparatus contains a chemical coating 340, which is to be applied to the object that is to receive the image, such as baseball 320. Chemical coating 340 is clear, able to bond with the object under harsh conditions, flexible, and heat resistant. In addition, chemical coating 340 allows the thermal transfer of image 90 to an object, here baseball 320, at a temperature lower than the melting point of the object. In a preferred embodiment, chemical coating 340 is a water-soluble, non-toxic, flexible compound that contains 10% or less (by weight) of N-Methyl Pyrrolidinone, 5% or less (by weight) of 1-Methoxy-2-Propanol, 5% or less (by weight) of an aromatic hydrocarbon mixture, and 5% or less (by weight) of a U.V. Absorber, which was originally formulated to coat the inside of water pipes. A chemical coating with these elements is available from Star Innovations, L.C. in New Century, Kans. under the trademark name BALLCOAT. It should be noted that substantial experimentation has shown that if the chemical coating of the preferred embodiment is used, then the sprayer apparatus must be able to provide a continuous slow stirring with paddle-like tongs (similar to the way bread dough is kneaded in a professional blending machine) so that the chemical coating remains appropriately blended for application.

In another preferred embodiment of the present invention, source 50 is a color photocopy of a color photograph. This color photocopy uses the same type of transfer paper that those skilled in the art would use for transferring a picture onto a T-shirt. Generally, the process for transferring an image from a photocopy to an object is nearly identical to the sublimation process for a photograph having an image.

However, it has been found that when the intended object is a baseball the use of a backing sheet 100 is not necessary for the photocopy transfer process. Even though sheet 100 is unnecessary, it may nevertheless be desirable to mount the photocopy on sheet 100 to provide additional support during the image transfer process.

In operation, a preferred embodiment of the present invention is carried out by first determining a target surface on baseball 320 and then spraying a chemical coating, such as the chemical coating mentioned above, onto the target surface, as shown in FIG. 4. Next, baseball 320 is placed within apparatus 130, so that baseball 320 rests on cup 310 against curved face 150a with the target surface facing die plate face 160a. Then, backing sheet 100 with attached photographic image 90 is disposed between the target surface of baseball 320 and planar face 160a as shown in FIG. 5. Image 90 is aligned with a desired position on the target surface by manually adjusting the location of the backing sheet.

Once image 90 has been aligned with a desired position on the target surface of baseball 320, actuator 180 (FIG. 4) is manipulated to move die plate 160 toward baseball 320 along track 170. Since backing sheet 100 with attached image 90 is disposed intermediate the target surface and face 160a, the movement of plate 160 in the direction of die 150 will eventually result in contact between image 90 and the target surface. However, the initial contact between image 90 and baseball 320, which is best shown in FIG. 5, involves only a portion of image 90 because of the curvature of baseball 320. Therefore, lever 180 is manipulated for further movement of plate 160 in the direction of die 150 until the target surface is substantially flat as shown in FIG. 6. The pressure required to flatten the target surface of a round ball will vary considerably, but in general apparatus 130 should be capable of delivering between 10 and 100 pounds of pressure. A typical baseball will require 60–70 pounds of pressure to flatten the target surface. Springs 260 accommodate limited movement of die 150 in response to movement of the die plate 160 against the ball which assures proper contact between the backing sheet and the ball. At this point, image 90 has full surface contact with the target surface of baseball 320, as shown in FIG. 6.

With image 90 firmly pressed against the target surface of baseball 320, the thermal transfer process may be initiated. Heat is applied to image 90 through backing plate 100 upon actuation of switch 220 and in response to the temperature setting indicated by knob 230. While the specific temperature required to achieve image transfer will vary over a wide range depending upon the ball covering, for a vinyl covered baseball properly covered with the chemical coating described above, the image should obtain a temperature of 190 to 200 degrees Fahrenheit. The heat source is located in proximity to member 180 so that the heat will be directed to image 90 while baseball 320 remains partially insulated. Backing sheet 100 absorbs some of the heat directed to image 90 which would otherwise be absorbed by the cover of baseball 320. Once the threshold temperature for sublimation has been attained, the sublimation process will occur nearly instantaneously so that a image 90 is transferred onto the target surface of baseball 320. Then, lever 180 is manipulated in a reverse orientation to move die plate 160 away from die 150 thus allowing baseball 320 to substantially regain its original curvature. It has been found that compressing baseball 320 for the relatively short period of time required to transfer the image (approximately 10 to 20 seconds) will not permanently deform baseball 320. In fact, baseball 320 will typically return to approximately the same shape it had prior to being compressed.

Next, a second application of heat may be applied. According to one embodiment of the present invention, a sheet 350 that has a front side 360 that is covered by polytetrafluoroethylene is provided and disposed between the target surface of baseball 320 and planar face 160a as shown in FIG. 7. It should be understood that instead of sheet 350, a fabric impregnated with polytetrafluoroethylene may be used, in which case the fabric would be draped over either the target surface of baseball 320 or die plate face 160a. In a preferred embodiment, instead of sheet 350, a fiberglass fabric impregnated with polytetrafluoroethylene and coated with a high-temperature, pressure-sensitive adhesive is provided and coupled by the adhesive to die plate face 160a before the method is begun. One such fabric, which has a total thickness of 0.0047 inches (with the adhesive having a thickness of 0.0017 inches) and which has an adhesive with an operating temperature range of –100 to 500 degrees Fahrenheit, is available from Andrew Robert Inc. in Natick, Mass. Utilizing this fabric is preferred because a step of disposing or inserting the fabric is not required, yet the fabric may be removed from die plate face 160 if it becomes damaged. Finally, it should be understood that a protective material, such as polytetrafluoroethylene, may be permanently coupled to die plate face 160a or that die plate face 160a may be made of a material resistant to the thermal transfer of image 90.

Actuator 180 (FIG. 4) is again manipulated to move die plate 160 toward baseball 320 so that sheet 350 comes into contact with baseball 320. Continued manipulation of lever 180 moves plate 160 in the direction of die 150 until the target surface is again substantially flat, and heat is applied for a second time to image 90, which is now on the target surface of baseball 320, through sheet 350. As before, it is preferred that image 90 obtain a temperature of between 190 and 200 degrees Fahrenheit for approximately 10 to 20 seconds. Thereafter, lever 180 is manipulated in a reverse orientation to move die plate 160 away from die 150 thus allowing baseball 320 to substantially regain its original curvature.

It should be apparent that if the source containing image 90 is a color photocopy, the above process may be utilized except that backing plate 100 may not be necessary.

Although the disclosed embodiments describe a baseball as the double convex object to receive the image, other suitable objects may be used. For example, softballs or other similar balls could be used in addition to baseballs. Inflatable balls, such as a soccer ball may also be utilized in either inflated or deflated condition for carrying out the method of the invention.

The quality of the image transferred to the object will often depend on the material covering the object. For a baseball, a vinyl cover has been found to work best with the present invention, but leather-covered baseballs also perform satisfactorily. Thus, the invention can be applied to any multiple curved object that is suitable for receiving an image through thermal transfer.

The quality of the image transferred to the object may also depend on the source of the original image. For example, it has been found that an image transferred onto a baseball from a photograph tends to fade more quickly over time than an image transferred onto a baseball from a photocopy. Whereas the cover of the baseball slowly absorbs the image transferred from the photograph, no significant fading has been observed after an image has been transferred onto a baseball from a photocopy.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A method for transferring an image onto an object having a surface that curves in two directions, said method comprising:

providing a generally planar source having a front side that contains an image and a back side;

selecting on an object a target surface for receiving the image;

applying a chemical coating to the target surface, said chemical coating allowing said image to transfer from said source to said target surface at a temperature that is lower then the melting point of the object, said chemical coating being a water-soluble compound that contains 10% or less (by weight) of N-Methyl Pyrrolidinone, 5% or less (by weight) of 1-Methoxy-2-Propanol, 5% or less (by weight) of an aromatic hydrocarbon mixture, and 5% or less (by weight) of a U.V. Absorber;

pressing the image against the target surface; and heating the image so that it will be transferred from the source to the target surface to produce a mirror image on the target surface.

2. The method of claim 1, further comprising, after the step of heating the image so that it can be transferred from the source to the target surface to produce a mirror image on the target surface, the steps of:

removing the source;

providing a protective material;

pressing the protective material against the target surface containing the image; and heating the protective material so that the image is heated and thereby secured to the target surface.

3. The method of claim 2, further comprising the step of removing the protective material from contact with the target surface.

4. A method for transferring an image onto an object having a surface that curves in two directions, said method comprising:

providing a generally planar source having a front side that contains an image and back side;

selecting on an object a target surface for receiving the image;

applying a chemical coating to the target surface, said chemical coating allowing said image to transfer from said source to said target surface at a temperature that is lower then the melting point of the object;

pressing the image against the target surface;

heating the image so that it will be transferred from the source to the target surface to produce a mirror image on the target surface;

removing the source;

providing a protective material comprising a fabric having a front side covered by a layer of polytetrafluoroethylene;

pressing the protective material against the target surface containing the image; and heating the protective material so that the image is heated and thereby secured to the target surface.

5. A method for transferring an image onto an object having a surface that curves in two directions, said method comprising:

providing a generally planar source having a front side that contains an image and a back side;

selecting on an object a target surface for receiving the image;

applying a chemical coating to the target surface, said chemical coating allowing said image to transfer from said source to said target surface at a temperature that is lower then the melting point of the object;

pressing the image against the target surface;

heating the image so that it will be transferred from the source to the target surface to produce a mirror image on the target surface;

removing the source;

providing a protective material comprising a fiberglass fabric impregnated with polytetrafluoroethylene and coated on one side with a high-temperature, pressure-sensitive silicon adhesive;

pressing the protective material against the target surface containing the image; and heating the protective material so that the image is heated and thereby secured to the target surface.

6. A method for transferring an image onto an object having a surface that curves in two directions, said method comprising:

providing a generally planar source having a front side that contains an image and a back side;

selecting on an object a target surface for receiving the image;

applying a chemical coating to the target surface, said chemical coating allowing said image to transfer from said source to said target surface at a temperature that is lower then the melting point of the object;

pressing the image against the target surface;

heating the image so that it will be transferred from the source to the target surface to produce a mirror image on the target surface;

removing the source;

providing a protective material;

pressing the protective material against the target surface containing the image;

heating the protective material so that the image is heated and thereby secured to the target surface; and removing the protective material from contact with the target surface.

7. The method of claim 6, wherein said step of heating the image so that it will be transferred from the source to the target surface includes heating the image to a temperature of about 200 degrees Fahrenheit or less.

8. The method of claim 6, wherein said step of heating the image so that it will be transferred from the source to the target surface includes heating the image to a temperature of about 190–200 degrees Fahrenheit for a time period of about 15 seconds or less.

9. The method of claim 6, wherein said step of pressing the image against the target surface includes compressing the object to substantially flatten the target surface.

10. The method of claim 6, wherein the protective material at least partially includes polytetrafluoroethylene.

11. A method for transferring an image onto an object having a surface that curves in two directions, said method comprising:

providing a generally planar source having a front side that contains an image and a back side;

selecting on an object a target surface for receiving the image;

applying a chemical coating to the target surface, said chemical coating allowing said image to transfer from said source to said target surface at a temperature that is lower then the melting point of the object;

pressing the image against the target surface;

heating the image so that it will be transferred from the source to the target surface to produce a mirror image on the target surface;

removing the source;

providing a protective material coupled with a die place face;

pressing the protective material against the target surface containing the image; and heating the protective material with the die place face so that the image is heated and thereby secured to the target surface.

12. The method of claim 11, wherein said step of heating the image so that it will be transferred from the source to the target surface includes heating the image to a temperature of about 200 degrees Fahrenheit or less.

13. The method of claim 11, wherein said step of heating the image so that it will be transferred from the source to the target surface includes heating the image to a temperature of about 190–200 degrees Fahrenheit for a time period of about 15 seconds or less.

14. The method of claim 11, wherein said step of pressing the image against the target surface includes compressing the object to substantially flatten the target surface.

15. The method of claim 11, wherein the protective material at least partially includes polytetrafluoroethylene.

16. The method of claim 11, further comprising the step of removing the protective material from contact with the target surface.

* * * * *